United States Patent [19]

Fontanelli et al.

[11] Patent Number: 4,504,610

[45] Date of Patent: Mar. 12, 1985

[54] SELF-EXTINGUISHING POLYMERIC COMPOSITIONS

[75] Inventors: Renzo Fontanelli; Gianluigi Landoni, both of Milan; Giovanni Legnani, Saronno, all of Italy

[73] Assignee: Montedison S.p.A., Milan, Italy

[21] Appl. No.: 577,891

[22] Filed: Feb. 7, 1984

[30] Foreign Application Priority Data

Feb. 7, 1983 [IT] Italy ............................. 19452 A/83

[51] Int. Cl.³ ............................. C08K 5/35; C08K 5/34
[52] U.S. Cl. ............................. 524/96; 524/100; 524/416
[58] Field of Search ............................. 524/96, 100, 416

[56] References Cited

U.S. PATENT DOCUMENTS

| | | | |
|---|---|---|---|
| 4,198,493 | 4/1980 | marciandi | 524/416 |
| 4,336,182 | 6/1982 | Landoni et al. | 524/416 |
| 4,348,493 | 9/1982 | Loffelman | 524/100 |
| 4,409,348 | 10/1983 | Wiezer et al. | 524/100 |

Primary Examiner—Lewis T. Jacobs

[57] ABSTRACT

Self-extinguishing polymeric compositions based on thermoplastic polymers, comprising, for 100 parts by weight of total composition:
(1) from 10 to 20 parts by weight of an ammonium phosphate or of an amine phosphate; and
(2) from 5 to 8 parts by weight of an oligomer or polymer derived from 1,3,5-triazine, having general formula:

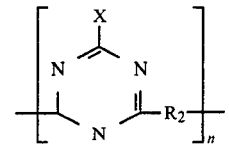

wherein:

$X = R_1{-}\overset{|}{N}H$ group, or a heterocyclic radical containing in the ring at least a nitrogen atom, and linked to the triazine ring through one of such nitrogen atoms,
$R_1$ = alkyl or cycloalkyl,
$R_2$ = divalent radical of piperazine, of the type

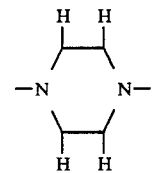

or a divalent radical of the type

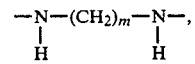

$n$ = an integer from 20 to 50, extremes included,
$m$ = an integer from 2 to 6, extremes included.

11 Claims, No Drawings

SELF-EXTINGUISHING POLYMERIC COMPOSITIONS

THE PRIOR ART

In the art there are known various processes for reducing or eliminating the combustibility of the polymer: thus, for example, a few of such processes are based on the use of metal compounds, in particular compounds of antimony, bismuth or arsenic, in combination with partially halogenated and thermally unstable organic compounds, such as chlorinated paraffinic waxes.

Other more recent processes such as are disclosed in U.S. Pat. Nos. 4,193,945 and 4,312,805 are based on the use of organic or inorganic phosphorus compounds combined with organic nitrogen-containing compounds, generally a resin prepared by condensation of urea, melamine or dicyandiamide with formaldehyde.

The latter retardant systems impart to the polymer containing them the property of forming a carbonaceous residue in consequence of fire or of application of a flame. Retardant systems of this type generally exhibit advantages such as absence of corrosions in the machines in which the polymers are processed, lower evolvement of smokes as compared to the systems containing metal compounds and halogen hydrocarbons, and the possibility of imparting satisfactory self-extinguishing properties to the polymers with a lesser amount of total additive and therefore without any excessive worsening of the mechanical properties of the polymers.

THE PRESENT INVENTION

We have now surprisingly found that it is possible to impart satisfactory antiflame properties to the thermoplastic polymers by addition of particular phosphonitrogenous additives which do not comprise aminoplastic resins and offer the advantage of giving place, in case of fire, to a still lower and not darkening evolvement of smokes.

The compositions forming the object of the present invention comprise, for 100 parts by weight of total composition:

(1) from 10 to 20 parts by weight of an ammonium phosphate or of an amine phosphate, and
(2) from 5 to 8 parts by weight of a nitrogenous water-insoluble compound, consisting of an oligomer or a polymer of a 1,3,5-triazine derivative, and having the general formula:

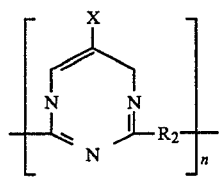 (I)

wherein:
X = a group of formula

or a heterocyclic group containing at least a nitrogen atom in the ring, and linked to the triazine ring by means of one of such nitrogen atoms, $R_1$ = an alkyl containing from 1 to 20 carbon atoms, or a cycloalkyl containing from 6 to 20 carbon atoms, $R_2$ = a divalent radical of piperazine, of the type

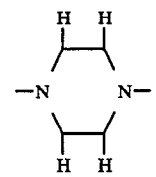

or a divalent radical of the type

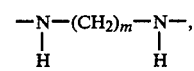

n = an integer ranging from 2 to 50, but preferably from 5 to 20, extremes included, m = an integer ranging from 2 to 6, extremes included.

Examples of radicals of the $R_1$ type are: methyl, ethyl, propyl, n-butyl, isobutyl, hexyl, octyl, decyl, dodecyl, cyclohexyl, propyl-cyclohexyl, butyl-cyclohexyl, decylcyclohexyl. Examples of heterocyclic groups defined as X are given by the radical of morpholine, piperidine and piperazine. Examples of radicals of the $R_2$ type are those of ethylenediamine, tetramethylenediamine, pentamethylene-diamine, hexamethylenediamine, piperazine, and alkyl-substituted piperazines.

The compounds of formula (I) are prepared by first reacting, at temperatures ranging from $-10°$ to $+10°$ C., at a pH from 5 to 7, the cyanuric acid chloride, in a polar solvent, such as for example acetone, water, etc., with an amine of formula $R_1$—$NH_2$, or with a heterocyclic compound containing in the ring a nitrogen atom, in a molar ratio of 1:1, where $R_1$ has the value indicated hereinabove, wherefore the 4-amino derivative of 2,6-dichloro-1,3,5-triazine is obtained.

Such derivative, after separation, is then reacted in hot conditions, in an apolar solvent, with an amine of formula $H_2$—N—$(CH_2)_m$—$NH_2$ or with piperazine or an alkyl-substituted derivative thereof, or with a mixture of such compounds, employing a molar ratio between triazine derivative and amine and/or piperazine equal to 1:1.

Among the various useful phosphates, the preferred ones are the ammonium polyphosphates which fall within general formula $(NH_4)_{n+2}P_nP_{3n+1}$, wherein n is an integer equal to or higher than 2; preferably the molecular weight of the polyphosphates should be high enough to ensure a low solubility in water.

The composition of the polyphosphates having the formula indicated hereinbefore, in which n is a sufficiently great number that preferably ranges from 50 to 500, is in practice the one corresponding to the formula of metaphosphates $(NH_4PO_3)_n$.

An example of such polyphosphates is the one known under the trade name "Exolit 263" (manufactured and sold by Hoechst) and having the composition $(NH_4PO_3)_n$ in which n is higher than 50; another example is the product known under the trademark "Phos- Check P/30" (produced by Monsanto Chemical Co.) and having a similar composition.

Further employable phosphates are those deriving from amines, such as e.g. dimethylammonium phosphate or diethylammonium phosphate, ethylendiamine phosphate, melamine ortho- or pyrophosphate.

A few examples illustrating the preparation of some compounds covered by general formula (I) are given hereinafter. All the parts indicated in such preparation are to be considered, unless otherwise specified, as parts by weight.

EXAMPLE 1

110.6 parts of cyanuric acid chloride and 400 parts of acetone were introduced into a 2-liter flask equipped with stirrer, thermometer, dropping funnel and cooling bath.

It was stirred till a solution was obtained, then 400 parts of ice and 100 parts of water were added so obtaining a finely divided suspension.

While externally cooling and maintaining the pH value between 5 and 7 and the temperature from $-10°$ to $+10°$ C., 51.1 parts of piperidine in 200 parts of water and 33 parts of sodium carbonate in 200 parts of water were simultaneously fed.

On conclusion of the reaction, the obtained white product was filtered and then washed with water.

After drying at 50°-60° C. under vacuum, there were obtained 130.6 parts of 2.6-dichloro-4-piperidine-1,3,5-triazine (I) (melting point=87°-88° C.) with a yield of 93.5%.

The structure of such compound was proved by spectrophotometric analysis.

Into a 1-liter flask equipped with stirrer, thermometer, reflux cooler and heating bath, there were introduced 400 parts of an apolar solvent (a mixture of triisopropylbenzenes), then 42.2 parts of product (I) and 16.3 parts of piperazine.

It was heated to 100° C. and maintained at such temperature during 3 hours.

15.2 parts of solid caustic soda were successively charged and it was heated to 150° C., maintaining the mass at this temperature during 20 hours.

After cooling, the product obtained was filtered, thoroughly washed with boiling water and dried.

46.5 parts of product (II) with a yield of 93% were obtained.

The product was insoluble in the common organic solvents and in water, its solubility values at room temperature being lower than 0.1%.

Such product exhibited a melting point higher than 290° C., and the following formula:

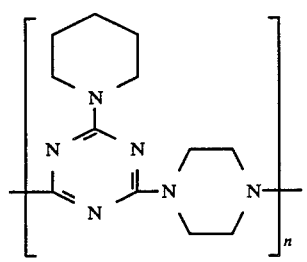

(II)

wherein n=12.

EXAMPLE 2

Into the same apparatus of example 1 there were charged 73.76 parts of cyanuric acid chloride and then 300 parts of acetone, while stirring until complete dissolution.

By addition of 300 parts of ice and 100 parts of water, such chloride was caused to precipitate in a finely particled form.

Successively, at a pH between 5 and 7 and while maintaining a temperature from $-10°$ to $+10°$ C. by means of an outer cooling, there were simultaneously fed 51.7 parts of ter.octylamine and 22 parts of sodium carbonate, dissolved in 100 cc of water.

At the end of the reaction, the resulting product was filtered and then washed on the filter with iced water.

92 parts of 2,6-dichloro-4-ter.octylamine-1,3,5-triazine (III) having a melting temperature of from 74° to 75° C. were obtained, the yield being of 83%. Into the same apparatus described in example 1, 69.3 parts of product (III), besides 400 parts of xylene were successively charged.

The solution was stirred and 22.2 parts of piperazine were then added. It was heated to 100° C. and this temperature was maintained for 2 hours. 21 parts of solid caustic soda were then added and the whole was heated at reflux during 20 hours.

After cooling, the resulting product was filtered, washed with water and dried.

68.2 parts of product (IV) with a yield of 97% were obtained.

The product was insoluble in water and in the usual organic solvents and had the formula:

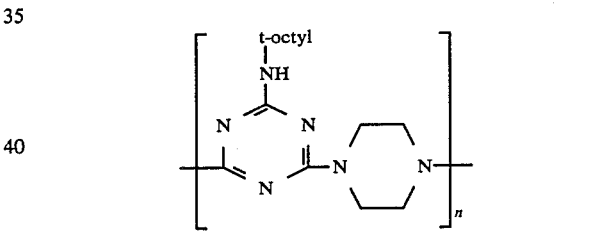

wherein n=15.

EXAMPLE 3

Into the same apparatus of example 1, there were charged 74 parts of cyanuric acid chloride, which were dissolved in 300 parts of acetone.

After precipitation of the chloride in a finely particled form, there were fed, simultaneously, 35 parts of morpholine dissolved in 150 parts of water and 22 parts of sodium carbonate dissolved in 150 parts of water, while maintaining a pH value between 5 and 7 and a temperature from $+10°$ to $-10°$ C.

Total reaction time=4 hours.

The resulting white precipitate was filtered, thus obtaining, after drying, 93 parts of 2,6-dichloro-4-morpholine-1,3,5-triazine (V), with a yield of 98.5% (product melting temperature=152°-154° C.).

In the same apparatus of example 1 there were dissolved 40 parts of product (V) in 500 parts of xylene. 15.5 parts of piperazine were added and, after a 15-minute stirring, 14 parts of solid caustic soda. It was then heated at reflux for 20 hours. After cooling to room temperature, the resulting product was filtered and thoroughly washed with warm water. After drying there were obtained 43 g of product (VI) insoluble in water and in the common organic solvents. Such product had a melting temperature higher than 290° C. and exhibited the formula:

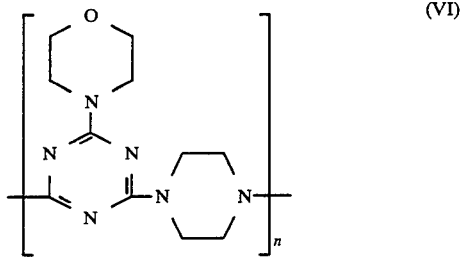

wherein n=15.

EXAMPLE 4

58.3 parts of product (I) of example 1 were condensed for 24 hours at reflux with 30.5 parts of hexamethylenediamine in 500 parts of xylene and 21 parts of solid caustic soda. After cooling, filtering, washing with water and drying, 71.8 parts of product (VII) insoluble in water and in the common organic solvents were obtained.

The product exhibited the formula

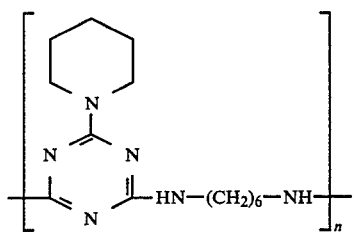

wherein n=20.

The self-extinguishing compositions of the present invention are preparable according to known methods: for example, the ammonium phosphate or the phosphate of an amine are first intimately mixed with the finely ground triazine nitrogenous compound (preferably having particles below 75 microns), and the mixture so obtained is added to the thermoplastic polymer in a turbo-mixer to form a homogeneous mix which is extruded and granulated. The granular product so obtained can be transformed into various articles according to any of the known molding techniques.

The antiflame additives of this invention are suited to be employed also in the field of the antifire paints. To determine the self-extinguishing properties of the polymeric compositions containing the anti-flame additives it may be operated as follows: the granular product is used to mold 3 mm (⅛ inch) thick plates in a MOORE plate press, by operating for 7 minutes at a pressure of 40 kg/cm² and at a suitable temperature.

The self-extinguishing power degree can be determined by measuring the oxygen index (according to ASTM D-2863) in a Stanton Redcroft apparatus, or by applying the UL-94 standards (published by "Underwriters Laboratories" USA), which provide an evaluation of the plastic materials' self-extinguishing power degree.

In the tests recorded on the following Table, for compositions containing the oligomers or polymer of formula (II), (IV), (VI) and (VII) prepared according to the preceding examples, the Vertical Burning Test was employed, which permits to classify the materials at the following three levels: 94 V-0, 94 V-1 and 94 V-2, which express, in the decreasing order, the uninflammability degree. An isotactic polypropylene in flakes having a melt flow index equal to 12 was used as thermoplastic polymer.

TABLE

Self-extinguishing compositions based on polypropylene

| | Parts by weight | | | | | | |
|---|---|---|---|---|---|---|---|
| | Ex. 1 | EX. 2 | Ex. 3 | Ex. 4 | Ex. 5 | Ex. 6 | Ex. 7 |
| Polypropylene | 78 | 78 | 78 | 75 | 78 | 78 | 78 |
| Antioxidant(*) | 1 | 1 | 1 | 1 | 1 | 1 | 1 |
| Ammonium polyphosphate ("Exolit 263") | 14 | 15 | 15,50 | 18 | 15 | 15 | 15 |
| Compound of formula (II) | 7 | 6 | 5,50 | 6 | | | |
| Compound of formula (IV) | | | | | 6 | | |
| Compound of formula (V) | | | | | | 6 | |
| Compound of formula (VII) | | | | | | | 6 |
| Oxygen index | 28,0 | 29,5 | 29,0 | 30,0 | 27,0 | 28,0 | 26,0 |
| UL - 94 (⅛inch) | V2 | V0 | V0 | V0 | V2 | V0 | V2 |

(*)Mixture of 6 parts of dilauryl-thiodipropionate and 4 parts of tetra [3-(3,5-di-t.butyl-4-hydroxyphenyl)-propionate] of pentaerythritol.

What we claim is:

1. Self-extinguishing polymeric compositions based on thermoplastic polymers, comprising, for 100 parts by weight of total compositions:
   (1) from 10 to 20 parts by weight of an ammonium phosphate or an amine phosphate; and
   (2) from 5 to 8 parts by weight of a nitrogenous water-insoluble compound, consisting of an oligomer or a polymer of a 1,3,5-triazine derivative, and having the general formula:

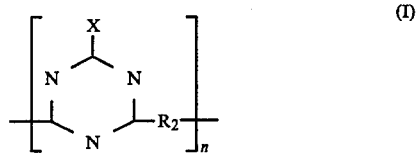

wherein
X=a group of formula

or a heterocyclic group containing at least a nitrogen atom in the ring, and linked to the triazinic ring through one of such nitrogen atoms, $R_1$ = an alkyl containing from 1 to 20 carbon atoms, or a cycloalkyl containing from 6 to 20 carbon atoms, $R_2$ = a divalent radical of piperazine of the type

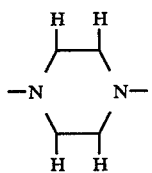

or a divalent radical of the type

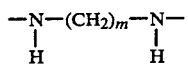

n = an integer from 2 to 50, extremes included;
m = an integer from 2 to 6, extremes included.

2. The compositions according to claim 1, in which the thermoplastic polymer is an olefinic polymer or copolymer.

3. The compositions according to claim 1, in which the olefinic polymer is polypropylene.

4. A self-extinguishing polymeric composition according to claim 1, comprising the compound having the formula

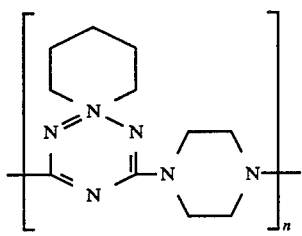

in which the value of n is 12.

5. The composition of claim 4, in which the polymer is polypropylene.

6. A self-extinguishing polymeric composition according to claim 1, comprising the compound of formula

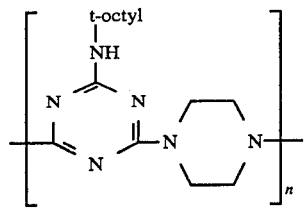

in which the value of n is 15.

7. The composition of claim 6, in which the polymer is polypropylene.

8. A self-extinguishing polymer composition according to claim 1, comprising the compound of formula

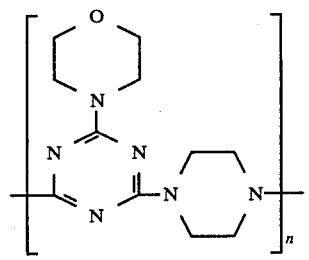

in which the value of n is 15.

9. The composition of claim 8, in which the polymer is polypropylene.

10. A self-extinguishing polymeric composition according to claim 1, comprising the compound having the formula

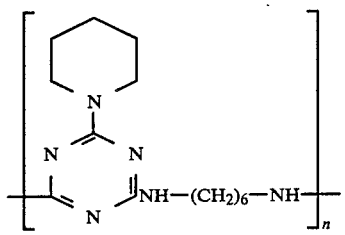

in which the value of n is 20.

11. The composition of claim 10, in which the polymer is polypropylene.

* * * * *